United States Patent
Kim et al.

(10) Patent No.: US 10,341,075 B2
(45) Date of Patent: Jul. 2, 2019

(54) METHOD FOR TRANSMITTING AND RECEIVING ACKNOWLEDGEMENT/NEGATIVE ACKNOWLEDGEMENT SIGNAL FOR UPLINK MULTI-USER DATA IN WIRELESS LAN SYSTEM, AND APPARATUS THEREFOR

(71) Applicant: LG Electronics Inc., Seoul (KR)

(72) Inventors: Jeongki Kim, Seoul (KR); Kiseon Ryu, Seoul (KR); Jinyoung Chun, Seoul (KR); Suhwook Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 26 days.

(21) Appl. No.: 15/536,313

(22) PCT Filed: Dec. 23, 2015

(86) PCT No.: PCT/KR2015/014191
§ 371 (c)(1),
(2) Date: Jun. 15, 2017

(87) PCT Pub. No.: WO2016/105128
PCT Pub. Date: Jun. 30, 2016

(65) Prior Publication Data
US 2017/0366321 A1    Dec. 21, 2017

Related U.S. Application Data

(60) Provisional application No. 62/096,890, filed on Dec. 25, 2014.

(51) Int. Cl.
*H04L 5/00* (2006.01)
*H04L 1/16* (2006.01)
*H04L 1/00* (2006.01)

(52) U.S. Cl.
CPC .......... *H04L 5/0055* (2013.01); *H04L 1/1614* (2013.01); *H04L 1/1671* (2013.01); *H04L 1/1685* (2013.01); *H04L 2001/0093* (2013.01)

(58) Field of Classification Search
CPC ... H04L 1/1614; H04L 1/1621; H04L 1/1628; H04L 5/0055
See application file for complete search history.

(56) References Cited

U.S. PATENT DOCUMENTS

2011/0090855 A1* 4/2011 Kim .................. H04B 7/0452
                                                        370/329
2011/0225440 A1  9/2011 Kwon et al.
2016/0143006 A1* 5/2016 Ghosh ................ H04W 74/004
                                                        370/329

FOREIGN PATENT DOCUMENTS

WO    2011102575 A1    8/2011
WO    2013170136 A1    11/2013
WO    2014179478 A1    11/2014

OTHER PUBLICATIONS

"Issues on UL-OFDMA Transmission", IEEE 802.11-14/1431r1, Sep. 2014, YH Kwon et al., Nov. 3, 2014.

* cited by examiner

*Primary Examiner* — Pao Sinkantarakorn
(74) *Attorney, Agent, or Firm* — Dentons US LLP

(57) ABSTRACT

The present document relates to a method for transmitting an acknowledgement/negative acknowledgement (ACK/NACK) signal for transmission data of a plurality of stations (STAs) by an access point (AP) in a wireless LAN (WLAN) system, and an apparatus therefor. To this end, the AP transmits a trigger frame to the plurality of STAs, and on receiving data from the plurality of STAs in response to the trigger frame, transmits ACK/NACK signals for the data received from the plurality of STAs through a multiuser (Continued)

block ACK frame (M-BA frame). Here, the M-BA frame includes ACK/NACK signals for STAs, the number of which is determined so as not to exceed a specific transmission unit time, among the ACK/NACK signals for the plurality of STAs, and the AP additionally transmits ACK/NACK signals to one or more STAs, to which ACK/NACK signals have not been transmitted through the M-BA, among the plurality of STAs.

14 Claims, 19 Drawing Sheets

METHOD FOR TRANSMITTING AND RECEIVING ACKNOWLEDGEMENT/NEGATIVE ACKNOWLEDGEMENT SIGNAL FOR UPLINK MULTI-USER DATA IN WIRELESS LAN SYSTEM, AND APPARATUS THEREFOR

This application is a 35 USC § 371 National Stage entry of International Application No. PCT/KR2015/014191 filed on Dec. 23, 2015, and claims priority to U.S. Provisional Application No. 62/096,890 filed on Dec. 25, 2014, all of which are hereby incorporated by reference in their entireties as if fully set forth herein.

TECHNICAL FIELD

The following description relates to a method of transmitting and receiving an acknowledgement signal for multi-user or multi-station (multi-STA) data in a wireless local area network system and an apparatus therefor.

BACKGROUND ART

Standards for a Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DETAILED DESCRIPTION OF THE INVENTION

Technical Problems

In the IEEE 802.11ax standards, an Uplink (UL) Orthogonal Frequency Division Multiple Access (OFDMA) transmission scheme and a UL Multi-User (MU) transmission scheme are expected to be used. Then, an Access Point (AP) may receive UL MU frames from a plurality of STAs at the same transmission opportunity and needs to transmit an Acknowledgement (Ack) frame in response to the UL MU frames.

In this case, efficient transmission of an Ack signal to the STAs through a block Ack frame may be considered. However, overhead may be problematic due to increased size of an MU block Ack frame for a plurality of STAs.

Hereinafter, a method and apparatus for efficiently transmitting the Ack signal in the above-described UL MU transmission situation will be described.

Technical Solutions

An aspect of the present invention devised to solve the above-described problems proposes a method of transmitting an Acknowledgement/Negative Acknowledgement (Ack/Nack) signal of transmission data of a plurality of stations (STAs) by an Access Point (AP) in a Wireless Local Area Network (WLAN) system, including transmitting a trigger frame to the plural STAs, receiving data from the plural STAs in response to the trigger frame, and transmitting Ack/Nack signals of data received from the plural STAs through a Multi-STA Block Ack (M-BA) frame, wherein the M-BA frame includes Ack/Nack signals for STAs, the number of which is determined not to exceed a specific transmission unit time, among the Ack/Nack signals for the plural STAs, and the AP additionally transmits Ack/Nack signals to one or more STAs to which the Ack/Nack signals have not been transmitted through the M-BA frame among the plural STAs.

The M-BA frame may include Ack/Nack signals for STAs, the number of which is determined not to exceed an Extended InterFrame Space (EIFS) time, among the Ack/Nack signals for the plural STAs.

The number of STAs determined not to exceed the specific transmission unit time may be differently determined according to an M-BA frame transmission scheme of the AP.

The AP may transmit information for requesting transmission of a Block Ack Request (BAR) or a Multi-STA BAR (M-BAR) together with the M-BA frame to the one or more STAs. Upon receiving the BAR or M-BAR from the one or more STAs, the AP may transmit the Ack/Nack signals for the one or more STAs through one or more Block Ack (BA) frames or another M-BA frame to the one or more STAs The M-BA frame may include information about transmission of the other M-BA frame through which the Ack/Nack signals for the one or more STAs are transmitted.

The method may further include receiving a Block Ack Request (BAR) transmitted based on Extended Distributed Channel Access (EDCA) from a first STA that has failed to receive the other M-BA frame until a specific timer T1 expires among the one or more STAs and transmitting an Ack/Nack signal for the first STA in response to reception of the BAR.

The method may further include receiving a Block Ack Request (BAR) or a Multi-STA BAR (M-BAR) through a resource region used by the one or more STAs for data transmission from the one or more STAs.

Another aspect of the present invention proposes a method of receiving an Acknowledgement/Negative Acknowledgement (Ack/Nack) signal of transmission data from an Access Point (AP) by a Station (STA) in a wireless local area network (WLAN) system, including receiving a trigger frame from the AP, transmitting data through a multi-STA frame to the AP in response to the trigger frame, and receiving an Ack/Nack signal of the transmitted data through a Multi-STA Block Ack (M-BA) frame, wherein, if the M-BA frame does not include an Ack/Nack signal for the STA, the STA receives the Ack/Nack signal with reference to information about an additional Ack/Nack signal transmission scheme of the M-BA frame.

The information about the additional Ack/Nack signal transmission scheme may be information for requesting transmission of a Block Ack Request (BAR) or a Multi-STA BAR (M-BAR) to the STA and the STA may transmit the BAR or the M-BAR to the AP according to the information for requesting transmission of the BAR or the M-BAR.

The information about the additional Ack/Nack signal transmission scheme may be information about another M-BA frame through which the Ack/Nack signal for the STA is transmitted and the STA may monitor the other M-BA frame unit until a specific timer T1 expires.

Another aspect of the present invention proposes an Access Point (AP) for transmitting an Acknowledgement/Negative Acknowledgement (Ack/Nack) signal of transmission data of a plurality of stations (STAs) in a Wireless Local Area Network (WLAN) system, including a transceiver configured to transmit a trigger frame to the plural STAs, receive data from the plural STAs in response to the trigger frame, and transmit Ack/Nack signals of data received from the plural STAs through a Multi-STA Block Ack (M-BA) frame, and a processor connected to the transceiver and configured to process the trigger frame, the received data, and the M-BA frame, wherein the processor causes the M-BA frame to include Ack/Nack signals for STAs, the number of which is determined not to exceed a specific transmission unit time, among the Ack/Nack signals for the plural STAs and additionally transmits Ack/Nack signals to one or more STAs to which the Ack/Nack signals have not been transmitted through the M-BA frame among the plural STAs.

The processor may cause the M-BA frame to include Ack/Nack signals for STAs, the number of which is determined not to exceed an Extended InterFrame Space (EIFS) time, among the Ack/Nack signals for the plural STAs.

Another aspect of the present invention proposes a Station (STA) for receiving an Acknowledgement/Negative Acknowledgement (Ack/Nack) signal of transmission data from an Access Point (AP) in a wireless local area network (WLAN) system, including a transceiver configured to receive a trigger frame transmitted to a plurality of STAs including the STA, transmit data to the AP in response to the trigger frame, and receive an Ack/Nack signal of the data through a Multi-STA Block Ack (M-BA) frame from the AP, and a processor connected to the transceiver and configured to process the trigger frame, the transmitted data, and the M-BA frame, wherein, if the M-BA frame does not include an Ack/Nack signal for the STA, the processor receives the Ack/Nack signal with reference to information about an additional Ack/Nack signal transmission scheme of the M-BA frame.

Advantageous Effects

According to the present invention as described above, an AP can efficiently transmit an Ack signal to a plurality of STAs without collision with a signal transmitted by another STA in a UL MU transmission situation.

BEST MODE FOR CARRYING OUT THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, the following description relates to a method for efficiently utilizing a channel having a wide bandwidth in a WLAN system and an apparatus therefor. To this end, a WLAN system to which the present invention is applicable will first be described in detail.

Figure 1:
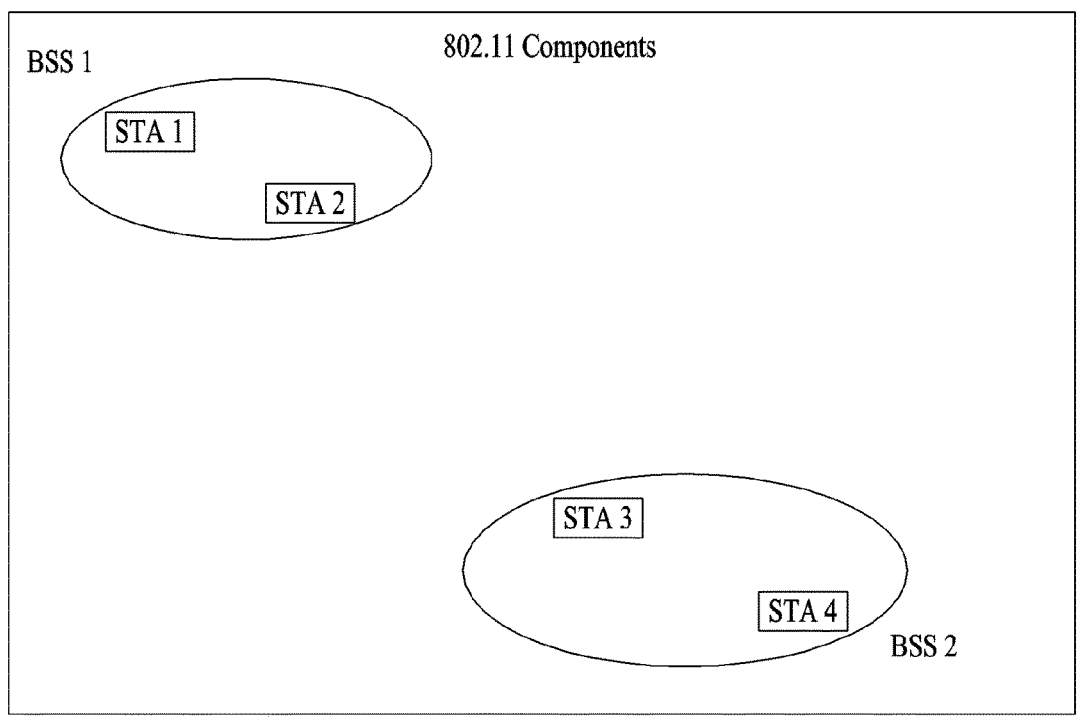
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
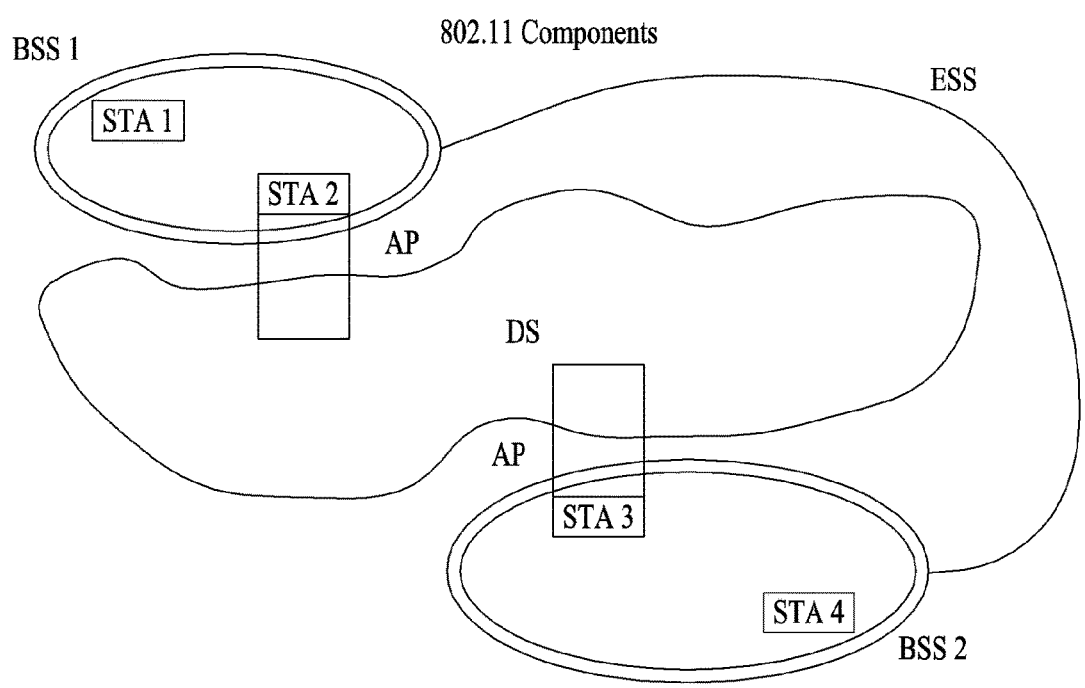
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above description, a block Ack scheme in a WLAN system will be described hereinbelow.

A block Ack mechanism is a scheme of improving channel efficiency by aggregating and then transmitting a plurality of Acks in one frame. There are two types of block Ack mechanism schemes: an immediate Ack scheme and a delayed Ack scheme. The immediate Ack scheme may be suitable for high-bandwidth, low-latency traffic transmission, whereas the delayed Ack scheme is favorable for applications that are insensitive to latency. Unless particularly specified otherwise in the below description, an STA that transmits data using the block Ack mechanism is referred to as an originator and an STA that receives the data using the block Ack mechanism is referred to as a recipient.

Figure 3:
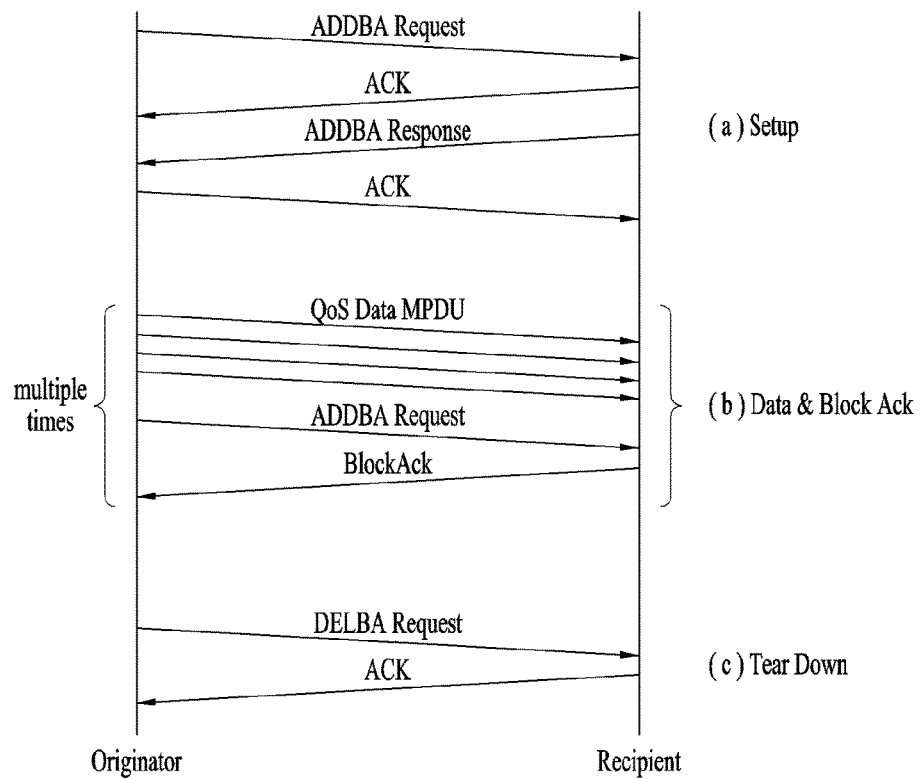
FIG. 3 is a diagram illustrating a block Ack mechanism used in a WLAN system.

FIG. 3 is a diagram illustrating a block Ack mechanism used in a WLAN system.

The block Ack mechanism may be initialized by an exchange of Add Block Acknowledgment (ADDBA) request/response frames as illustrated in FIG. 3 ((a) Setup step). After the block Ack mechanism is initialized, a block of Quality of Service (QoS) data frames may be transmitted by an originator to a recipient. Such a block may be started within a polled Transmission Opportunity (TXOP) or by winning Enhanced Distributed Channel Access (EDCA) contention. The number of frames in the block may be limited. MAC Packet Data Units (MPDUs) in the block of frames may be acknowledged by a BlockAck frame, which is requested by a BlockAckReq frame ((b) Data & Block Ack step).

When the originator has no data to transmit and a final block Ack exchange is completed, the originator may end the block Ack mechanism by transmitting a Delete Block Acknowledgment (DELBA) frame to the recipient. Upon receiving the DELBA frame, the recipient may release all resources allocated for Block Ack transfer ((c) Tear Down step).

Figure 4:
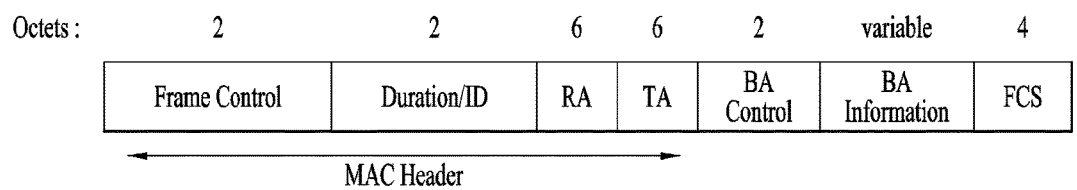
FIG. 4 is a diagram illustrating a basic configuration of a Block Ack frame.

FIG. 4 is a diagram illustrating a basic configuration of a block Ack frame.

The block Ack frame may include a MAC Header field, a Block Ack (BA) Control field, and a BA Information field. The MAC Header field may include a Frame Control field, a Duration/ID field, an RA field, and a TA field. Herein, the RA field represents an address of a reception STA and the TA field represents an address of a transmission STA.

Figure 5:
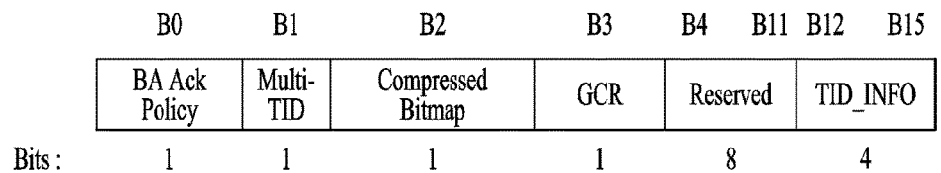
FIG. 5 is a diagram illustrating a detailed configuration of a BA Control field in FIG. 4.

FIG. 5 is a diagram illustrating a detailed configuration of the BA Control field in FIG. 4.

A value of a BA Ack Policy subfield in the BA Control field may have the meaning shown in Table 1 below.

TABLE 1

| Value | Meaning |
| --- | --- |
| 0 | Normal Acknowledgment. The BA Ack Policy subfield is set to this value when the sender requires immediate acknowledgment. The addressee returns an Ack frame. The value 0 is not used for data sent under HT-delayed Block Ack during a PSMP sequence. The value 0 is not used in frames transmitted by DMG STAs. |
| 1 | No Acknowledgment. The addressee sends no immediate response upon receipt of the frame. The BA Ack Policy is set to this value when the sender does not require immediate acknowledgment. The value 1 is not used in a Basic BlockAck frame outside a PSMP sequence. The value 1 is not used in a Multi-TID BlockAck frame. |

Meanwhile, Multi-Traffic Identifier (TID), Compressed Bitmap, and GCR subfields in the BA Control field may determine possible BlockAck frame variants according to the following regulation.

TABLE 2

| Multi-TID subfield value | Compressed Bitmap subfield value | GCR subfield value | BlockAck frame variant |
| --- | --- | --- | --- |
| 0 | 0 | 0 | Basic BlockAck |
| 0 | 1 | 0 | Compressed BlockAck |
| 1 | 0 | 0 | Extended Compressed BlockAck |
| 1 | 1 | 0 | Multi-TID BlockAck |
| 0 | 0 | 1 | Reserved |
| 0 | 1 | 1 | GCR BlockAck |
| 1 | 0 | 1 | Reserved |
| 1 | 1 | 1 | Reserved |

Figure 6:
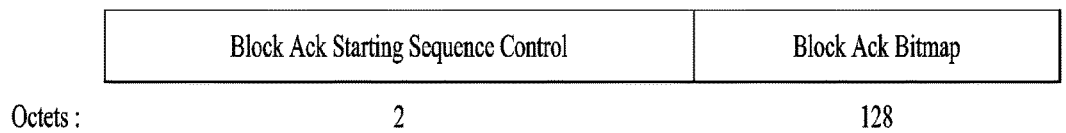
FIG. 6 is a diagram illustrating a detailed configuration of a BA Information field in FIG. 4.
Figure 7:
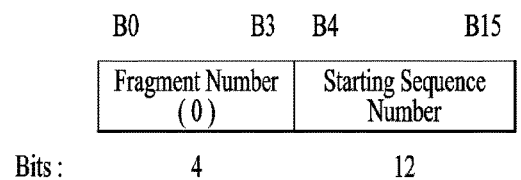
FIG. 7 is a diagram illustrating a configuration of a Block Ack Starting Sequence Control subfield.

FIG. 6 is a diagram illustrating a detailed configuration of the BA Information field in FIG. 4 and FIG. 7 is a diagram illustrating a configuration of a Block Ack Starting Sequence Control subfield.

As illustrated in FIG. 6, the BA Information field may include a Block Ack Starting Sequence Control (SSC) subfield and a Block Ack Bitmap subfield.

As illustrated in FIG. 6, the Block Ack Bitmap subfield is 128 octets in length and thus may represent a reception status of 64 MAC Service Data Units (MSDUs). If a bit position n of the Block Ack Bitmap subfield is set to 1, this may indicate that an MPDU having an MPDU sequence control value corresponding to (SSC+n) has been successfully received, wherein SSC denotes a value of the Block Ack Starting Sequence Control subfield. In contrast, if the bit position n of the Block Ack Bitmap field is set to 0, this may indicate that the MPDU having the MPDU sequence control value corresponding to (SSC+n) has not been received. Each of values of an MPDU Sequence Control field and the Block Ack Starting Sequence Control subfield may be treated as a 16-bit unsigned integer. For unused fragment numbers of an MSDU, corresponding bits in a bitmap may be set to 0.

Figure 8:
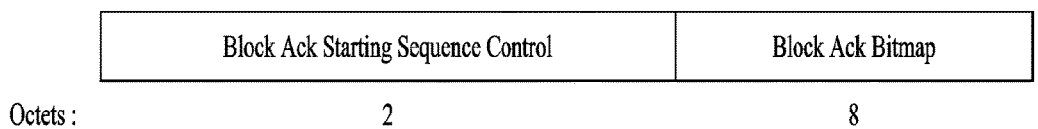
FIG. 8 is a diagram illustrating a configuration of a BA Information field of a compressed Block Ack frame.

FIG. 8 is a diagram illustrating a configuration of a BA Information field of a compressed Block Ack frame.

As illustrated in FIG. 8, a Block Ack Bitmap subfield of the BA Information field of the compressed Block Ack frame may be 8 octets in length and indicate a reception status of 64 MSDUs and A-MSDUs. The first bit of a bitmap corresponds to an MSDU or an A-MSDU matching a value of a Starting Sequence Number subfield and respective bits of the bitmap may sequentially correspond to MSDUs or A-MSDUs after the above MSDU or the A-MSDU.

Figure 9:
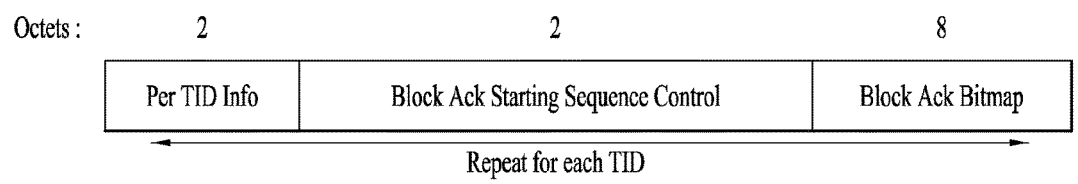
FIG. 9 is a diagram illustrating a BA Information field of a multi-TID Block Ack frame.

FIG. 9 is a diagram illustrating a BA Information field of a multi-TID BlockAck frame.

A TID_INFO subfield of the BA Information field of the multi-TID BlockAck frame contains information about the number of TIDs in the BA Information field. Specifically, a value of the TID_INFO subfield represents (the number of TIDs corresponding to information of the BA Information field)−1. For example, if the value of the TID_INFO subfield is 2, this may indicate that the BA Information field contains information about three TIDs.

Meanwhile, the multi-TID BlockAck frame may include a Per TID Info subfield in addition to a Block Ack Starting Sequence Control subfield and a Block Ack Bitmap subfield as illustrated in FIG. 9. The first emerging Per TID Info, Block Ack Starting Sequence Control, and Block Ack Bitmap subfields may be transmitted in correspondence to the lowest TID value and subsequently repeated subfields may correspond to the next TID. A triplet of these subfields may be repeated per TID.

Figure 10:
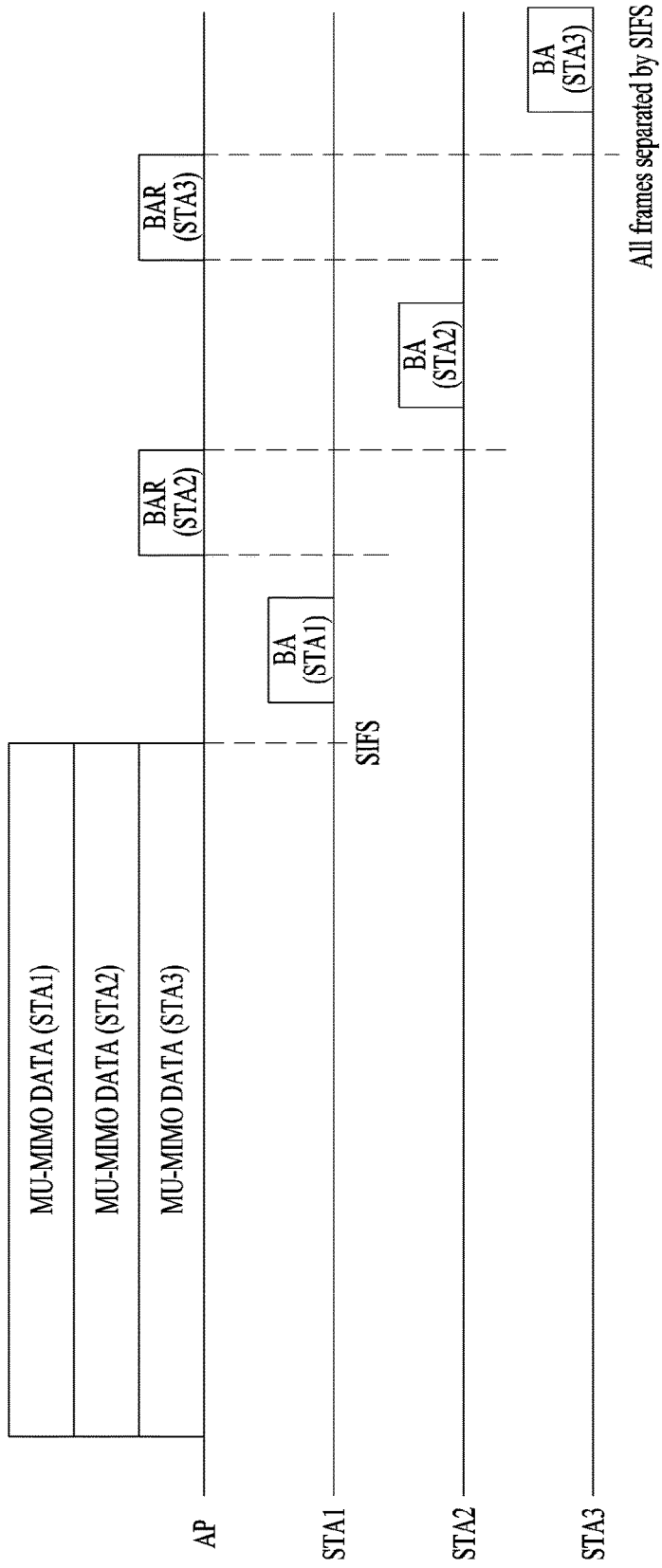
FIGS. 10 and 11 are diagrams for explaining the case in which a block Ack mechanism is applied to a DL MU-MIMO scheme.
Figure 11:
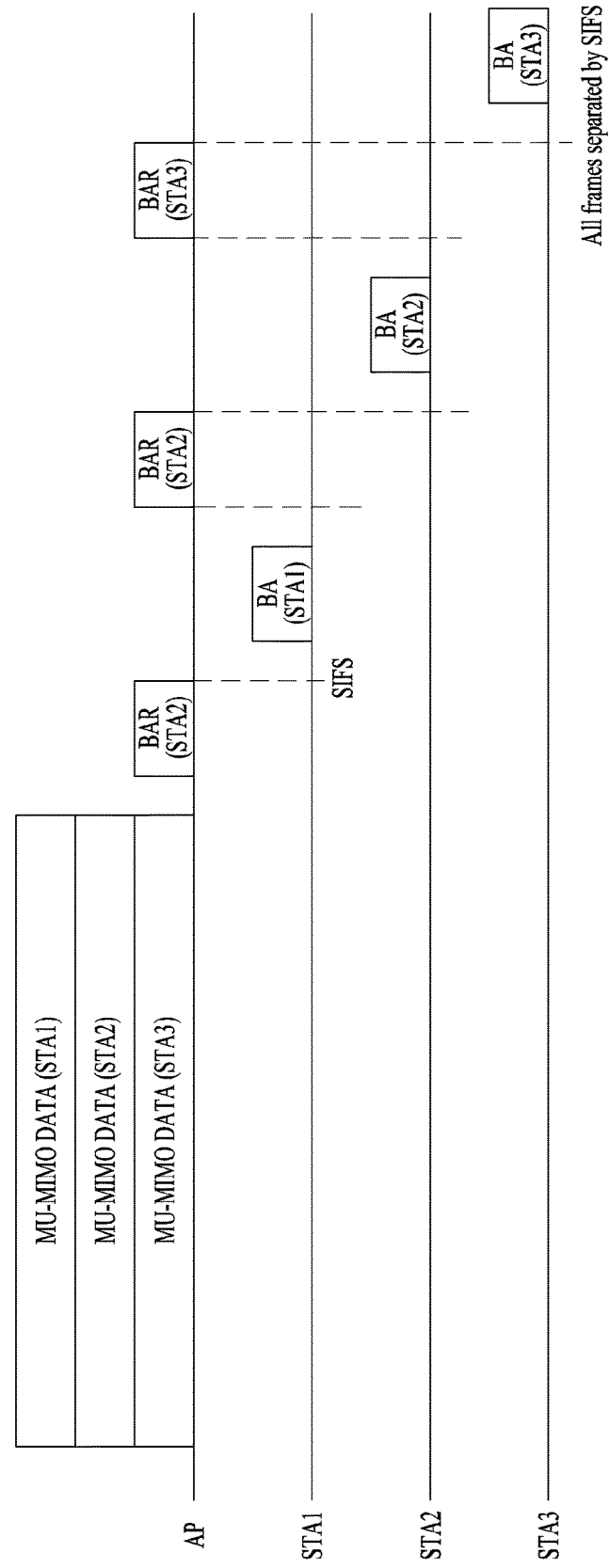

FIGS. 10 and 11 are diagrams for explaining the case in which a block Ack mechanism is applied to a DL MU-MIMO scheme.

As illustrated in FIGS. 10 and 11, an AP may transmit MU-MIMO data frames to a plurality of STAs STA1 to STA3.

It is assumed in FIG. 10 that frame exchange is performed after a Short InterFrame Space (SIFS) after an MU PLCP Packet Data Unit (PPDU) is transmitted. It is also assumed in FIG. 10 that for STA1, an implicit block Ack request is configured as Ack policy and, for STA2 and STA3, a block Ack is configured as Ack policy. Then, STA1 may immediately transmit a BA frame after receiving a DL MU PPDU even without receiving a request for the block Ack. In contrast, the AP may perform polling by transmitting a BA request (BAR) frame to STA2 and STA3 and then STA2 and STA3 may transmit BA frames.

Meanwhile, FIG. 11 illustrates an example of performing frame exchange without an SIFS after an MU PPDU is transmitted and it is assumed that a block Ack is configured as Ack policy for all STAs. Therefore, the AP may perform polling by transmitting a BAR frame to all STAs.

Figure 12:
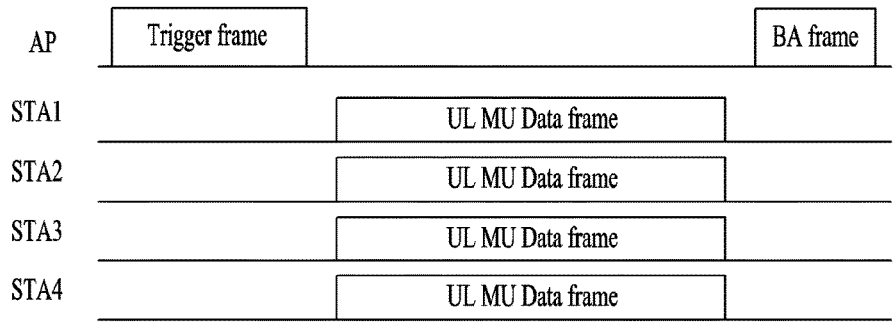
FIG. 12 is a diagram for explaining a UL MU transmission situation to which the present invention is applicable.

FIG. 12 is a diagram for explaining a UL MU transmission situation to which the present invention is applicable.

A UL MU transmission scheme may be used in an 802.11ax system as described above and may be initialized when an AP transmits a trigger frame to a plurality of STAs (e.g., STA1 to STA4) as illustrated in FIG. 12. The trigger frame may include UL MU allocation information (e.g., resource location and size, STA IDs, an MCS, and an MU type (MIMO, OFDMA, etc.)). Specific examples of information transmitted in the trigger frame may be as follows.

TABLE 3

Duration of UL MU frame
Number of allocation (N)
Each allocation's Information
  SU/MU
  AID (for MU, as many AIDs as the number of STAs are additionally included.)
  Power adjustment
  Tone(/Resource) allocation information (e.g., bitmap)
  MCS
  Nsts
  STBC
  Coding
  Beamformed
  Etc.

Meanwhile, as illustrated in FIG. 12, the AP may obtain a TXOP for transmitting the trigger frame via a contention procedure in order to access a medium. The STAs may transmit UL data frames with a format indicated by the AP after an SIFS of the trigger frame. It is assumed that the AP according to the present invention transmits an Ack of the UL MU data frames through a Block Ack (BA) frame.

However, the above-described BA frame for the UL MU frames considerably increases in size as compared with a BA frame for a UL MU frame, thereby causing a serious overhead problem. For example, the BA frame transmitted by STA1 in FIGS. 10 and 11 includes BA information about data transmitted by the AP to STA1, whereas the BA frame transmitted by the AP in FIG. 12 includes BA information about the UL MU data frames transmitted by STA1 to STA4. In addition, since the size of a MAC frame corresponds to 32 bytes when a compressed Block Ack is used and 150 bytes when a normal block Ack is used, overhead may be problematic.

Accordingly, exemplary embodiments of the present invention propose a method of efficiently transmitting a BA frame in a UL MU situation by using a multi-TID BA frame format among the above-described BA frames.

Figure 13:
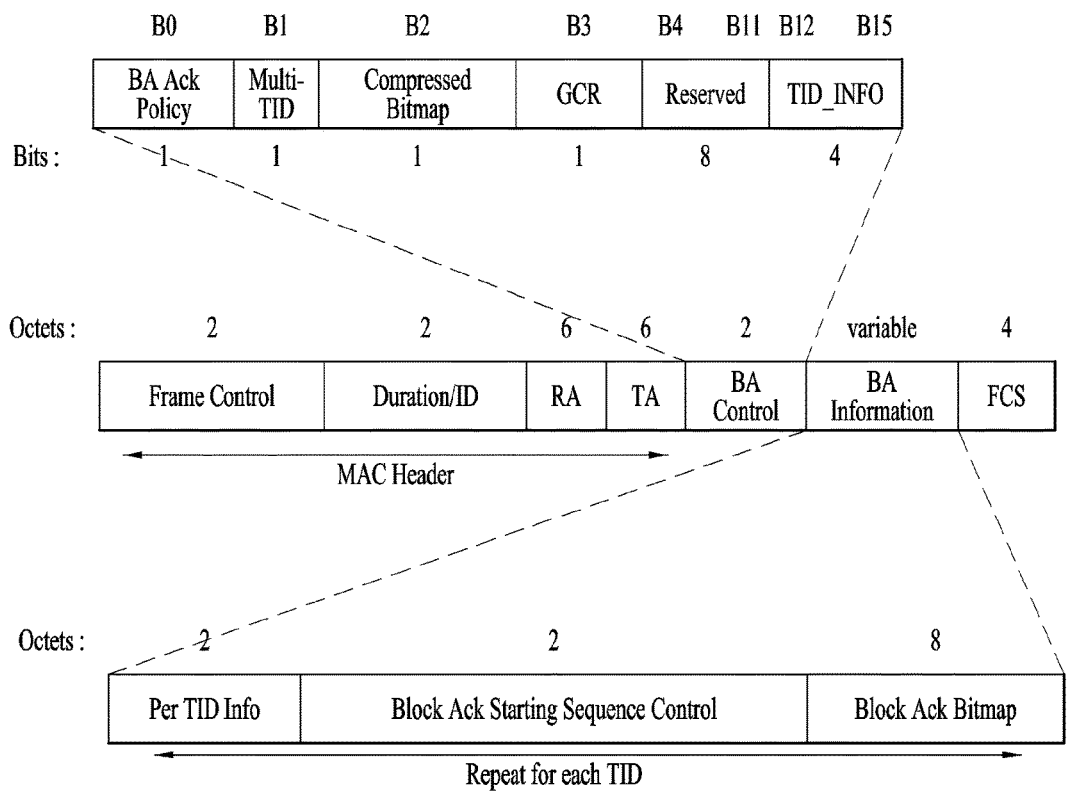
FIG. 13 is a diagram illustrating a frame structure to be used for a DL MU block Ack mechanism according to an exemplary embodiment of the present invention.

FIG. 13 is a diagram illustrating a frame structure to be used for a DL MU block Ack mechanism according to an exemplary embodiment of the present invention.

A multi-STA BA frame or an M-BA frame to be used according to an embodiment of the present invention may basically have a multi-TID BA frame as illustrated in FIG. 13 and may desirably include an indicator indicating that a corresponding BA frame is not a simple multi-TID BA frame but a multi-STA BA frame or an M-BA frame. Accordingly, a BA Information field may include BA information about different STAs as opposed to a conventional field.

In FIG. 13, a Multi-AID field in a BA Control field indicates whether BA information including Association Identifier (AID) information is included in the BA Information field and the BA information (Block Ack Starting Sequence Control and Block Ack Bitmap) may be included and transmitted per AID.

In this case, if the number of STAs increases, overhead of the BA frame increases as well. For example, when 18

OFDMA STAs are present at a frequency of 40 MHz, if the BA frame is 238 bytes in size and is transmitted in MCS 0, an overhead of about 85 symbols (340 μs) occurs.

As a solution to the afore-mentioned problem, the BA Information field may be configured to selectively include (1) a Block Ack Starting Sequence Control field and (2) a Block Ack Bitmap field. For example, when an AP has successfully received data of all STAs, this may be simply indicated by an indicator representing that data of all STAs has been successfully received without the need to include both the Block Ack Starting Sequence Control field and (2) the Block Ack Bitmap field.

Notably, in a normal M-BA transmission situation, as many BA Information fields (Per AID Info, Block Ack Starting Sequence Control, and Block Ack Bitmap) as the number of AIDs are repeatedly included in the BA Information frame and the number of STAs increases, thereby incrementing the size of the BA frame. For example, if the BA frame is transmitted using an 11a PPDU frame format and MCS 0 (BPSK ½ coding rate) and there are 8 STAs, a BA frame transmission time will be 184 μs exceeding an Extended InterFrame Space (EIFS) time (e.g., 96 us based on 6 Mbps in 11a).

In this case, an STA that is located in the same transmission region as a BA reception STA but is in a hidden relationship with a BA transmission STA may attempt to transmit the BA frame after the EIFS and thus may not succeed in BA transmission.

Hereinafter, a method for solving a problem of transmission failure of a Multi-STA BA frame due to an EIFS operation of a legacy STA as described above will be proposed.

Figure 14:
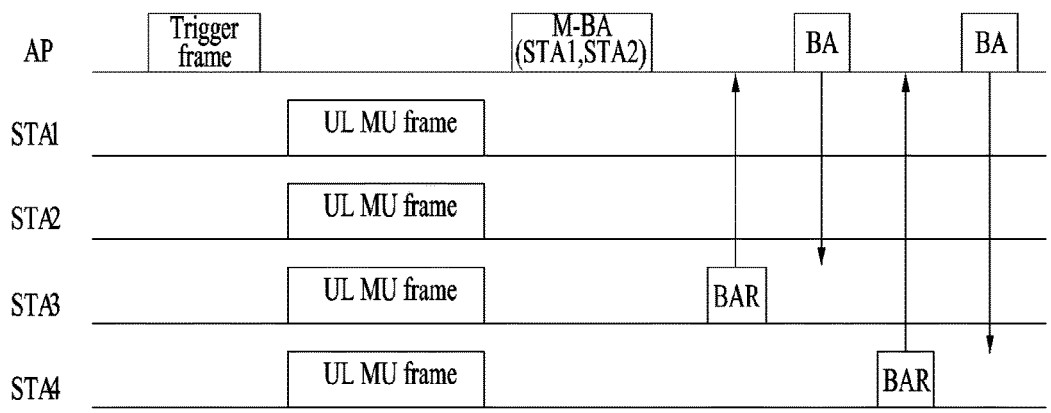
FIG. 14 is a diagram for explaining a method of performing M-BA transmission by an AP according to an embodiment of the present invention.

FIG. 14 is a diagram for explaining a method of performing M-BA transmission by an AP according to an embodiment of the present invention.

Upon transmitting a Multi-STA BA (M-BA) of UL MU frames, an AP according to an embodiment of the present invention may transmit BA/Ack information about restricted STAs in the M-BA so as not to exceed an EIFS time. For example, upon transmitting the M-BA in MCS 0 and 11a format, the AP may transmit BA information about two STAs in the M-BA.

To easily explain the present invention, a description of FIG. 14 will be given under the assumption that BA information about two STAs is included in the M-BA. However, BA information about more than the two STAs (e.g., 4 or 8 STAs) may be included in the M-BA according to scheduling (e.g., an MCS) of the AP. Meanwhile, while a criterion that causes the AP to perform M-BA transmission for a time not exceeding an EIFS time has been exemplarily described, a determination about how many STAs can be included in the M-BA may differ according to a transmission unit, etc. In this embodiment, efficient processing related to an STA that fails to receive an Ack when the AP transmits an M-BA that does not include an Ack for one or more STAs among a plurality of STAs is mainly described.

As described above, it is proposed that the AP that has transmitted an M-BA frame that does not include an Ack for one or more STAs (e.g., STA3 and STA4 in FIG. 14) among a plurality of STAs transmit, in the M-BA frame, information about an Ack transmission scheme for the one or more STAs (STA3 and STA4).

The information about additional Ack transmission may be information for requesting a BA or M-BA of STAs or may be information about M-BA frame transmission for additional Ack transmission. In FIG. 14, the first case is illustrated by way of example.

Specifically, in FIG. 14, when STAs that have transmitted UL MU frames receive an M-BA frame after an SIFS, if there is no Ack/BA information thereabout in the M-BA frame, the STAs may transmit BAR frames to the AP and receive the Ack/BA information from the AP. Herein, the STAs may transmit the BAR frames based on information included in the M-BA frame.

Figure 15:
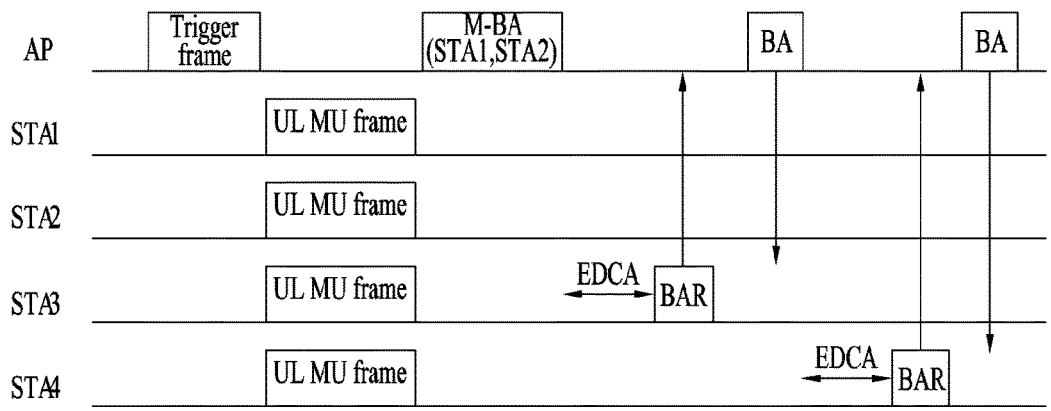
FIGS. 15 and 16 illustrate a method of transmitting an Ack according to another embodiment of the present invention.
Figure 16:
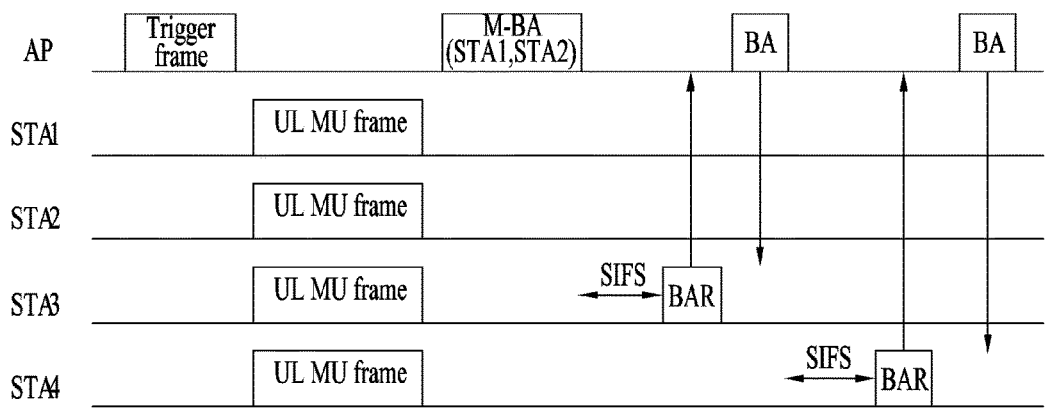

FIGS. 15 and 16 illustrate a method of transmitting an Ack according to another embodiment of the present invention.

If the AP allocates UL MU transmission regions through a Trigger frame to STA1, STA2, STA3, and STA4, then STA1, STA2, STA3, and STA4 may transmit UL MU frames to the AP through the allocated transmission regions. Upon receiving the UL MU frames, the AP may transmit Ack/BA information to the STAs by transmitting an M-BA. In the examples of FIGS. 15 and 16, the AP transmits BA information about STA1 and STA2 in the M-BA. Since STA3 and STA4 cannot find Ack/BA information thereabout upon receiving the M-BA, STA3 and STA4 transmit BAR frames to the AP and receive BAs from the AP.

Herein, the BAR may be transmitted on a contention (e.g., EDCA) basis and FIG. 15 is different from FIG. 14 in terms of BAR transmission scheme.

Meanwhile, the STAs that have not acquired BA information in the M-BA may transmit BARs on an SIFS basis based on an order of the STAs. Such an example is illustrated in FIG. 16.

When STAs that have transmitted UL MU frames based on the Trigger frame according to an embodiment of the present invention receive the M-BA, if BA information thereabout is not included in the M-BA, the STAs may transmit BAR frames to the AP through an SIFS operation in an order scheduled in the Trigger frame. Upon receiving the BAR frames from the STAs, the AP may transmit the BAs to the STAs after an SIFS.

In the above example, STA3 and STA4 may sequentially transmit the BAR frames to the AP at BAR transmission times thereof because BA information thereabout is not included in the M-BA.

Figure 17:
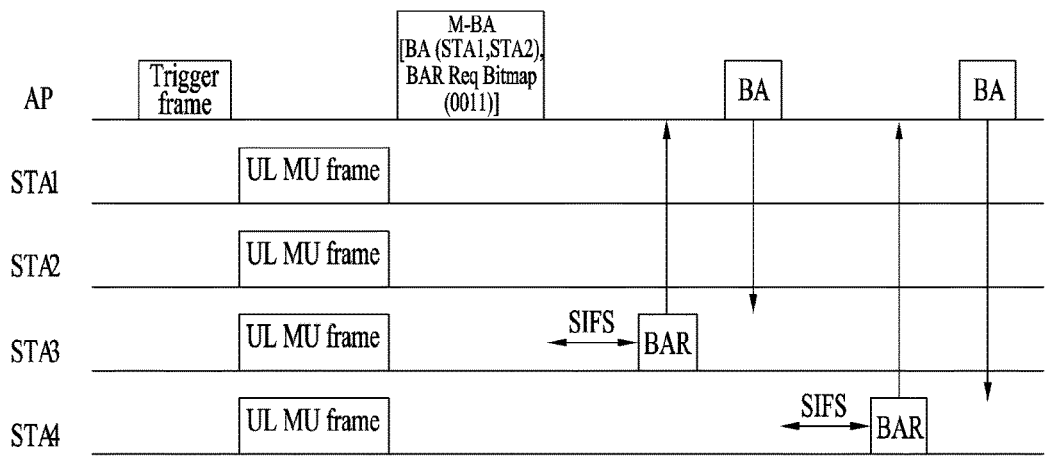
FIGS. 17 to 19 are diagrams illustrating the case in which a BAR Request Bitmap is used for additional Ack transmission according to an embodiment of the present invention.
Figure 18:
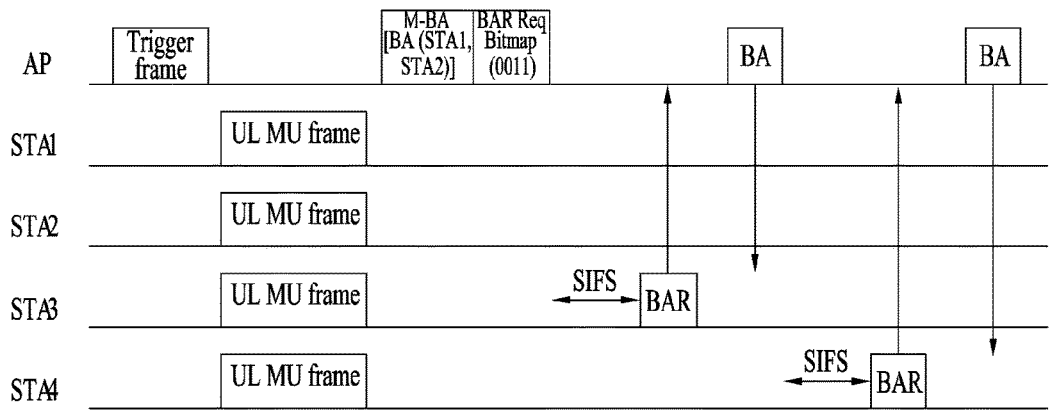
Figure 19:
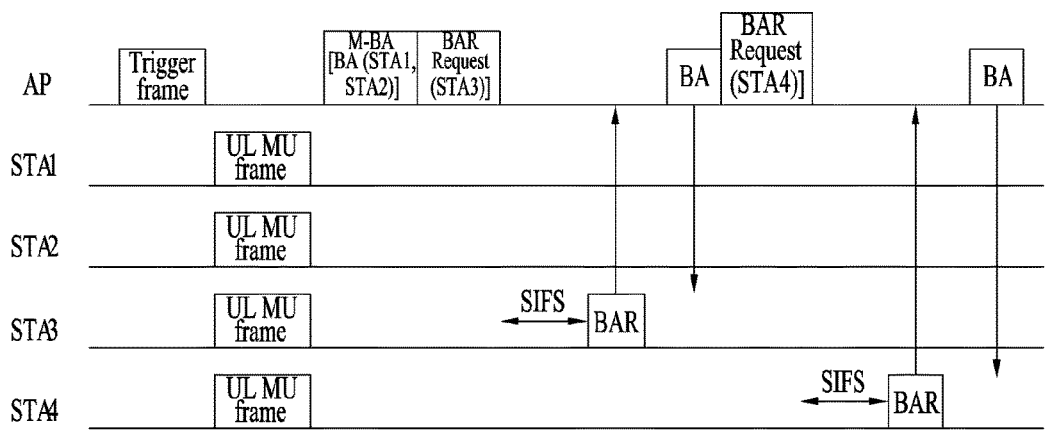

FIGS. 17 to 19 are diagrams illustrating the case in which a BAR Request Bitmap is used for additional Ack transmission according to an embodiment of the present invention.

As illustrated in FIG. 17, upon transmission of an M-BA, the AP may inform STAs of information (e.g., a BAR Request (Req) Bitmap) indicating which STA transmits a BAR by including the information in the M-BA frame. Upon receiving the M-BA, STAs may check the BAR Req Bitmap included in the M-BA frame and determine whether to transmit BARs.

While the BARs may be transmitted using the above-described EDCA or SIFS method, the method of transmitting the BARs is not limited thereto. The BAR Req Bitmap is configured in an order of STAs allocated in a Trigger frame and each bit may indicate a corresponding one of the STAs. An STA corresponding to a bit set to 1 in the bitmap may transmit a BAR to the AP after receiving the M-BA. The bitmap may be 4, 8, or 16 bits in size. The bitmap may be included in the M-BA as a fixed size or variable size information thereof may be transmitted in the M-BA.

Information indicating which STA transmits the BAR may be represented in the form of an AID or a partial AID in addition to the bitmap. For example, if the information is expressed in the form of the AID, AID information about STAs that are to transmit BARs will be included in the M-BA.

In the example of FIG. 17, since the BAR Req Bitmap is set to 0011, STA3 and STA4 transmit the BARs to the AP. In the example of FIG. 17, STA3 and STA4 may sequentially transmit the BARs through an SIFS operation at times when they are to transmit the BARs.

Meanwhile, the information (e.g., BAR Req Bitmap) indicating which STA transmits the BAR may be transmitted using another frame together with the M-BA instead of being transmitted in the M-BA frame, which is exemplarily illustrated in FIG. 18.

In addition, the information indicating which STA transmits the BAR may be transmitted in both an M-BA and a BA and may be represented in the form of the BAR Req Bitmap or the AID/Partial AID, which is exemplarily illustrated in FIG. 19.

In the example of FIG. 19, a BAR Request includes the information indicating which STA is to transmit the BAR. The first BAR Request indicates STA3 (e.g., BAR Req Bitmap=0010) and the second BAR Request indicates STA4 (e.g., BAR Req Bitmap=0001). After receiving the BAR Requests, STA3 and STA4 may transmit respective BARs to the AP. Similar to the BAR Req Bitmap, BAR Request information may be transmitted in the M-BA or the BA.

STAs may use other legacy frames such as Clear-To-Send (CTS) and Ack instead of the BAR frame or use a new frame (referred to as an M-BAR in the present invention).

That is, when STAs that have transmitted UL MU frames fail to acquire BA information through the first M-BA, the STAs may request that the AP transmit the M-BA instead of the BA. Herein, the STAs may transmit one of BAR, CTS, Ack, and new (e.g., M-BAR) frames to the AP and, upon receiving one of the BAR, CTS, Ack, and new (e.g., M-BAR) frames, the AP that has transmitted the M-BA may transmit BA information to the STAs by transmitting the M-BA after an SIFS. For ease of description, only the M-BAR among the frames that can replace the BAR as described previously will be used hereinbelow.

Figure 20:
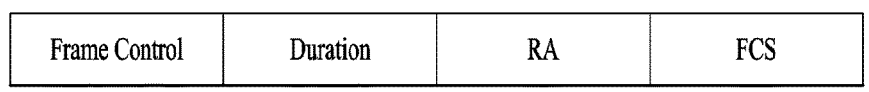
FIG. 20 is a diagram illustrating an exemplary format of an M-BAR frame according to an embodiment of the present invention.

FIG. 20 is a diagram illustrating an exemplary format of an M-BAR frame according to an embodiment of the present invention.

An RA field in the M-BAR frame of FIG. 20 may be configured as an SA (i.e., BSSID of an AP) included in an M-BA. If an M-BAR is transmitted with a non-HT PPDU format (e.g., 11a PPDU format), the M-BAR may be duplicate and transmitted on a 20 MHz basis and, if the M-BAR is transmitted with a 11ax PPDU format, the M-BAR may be duplicated and transmitted on a chunk (e.g., 242 tones) basis.

Considering the above-described M-BAR that is transmitted in a normal BAR frame including information about a detailed Ack reception method, such an Ack reception method has an advantage of reducing signaling overhead because the M-BAR is transmitted in a simple form as illustrated in FIG. 20 under the assumption that the Ack reception method is known to STAs and an AP.

In the above example, the M-BAR frame transmitted by STAs that have received an M-BA may be transmitted in the form of an NDP frame format (L-STF, L-LTF, L-SIG, or HE-SIGs) or a PHY preamble (L-STF, L-LTF, or L-SIG).

The above M-BAR may be transmitted using one of the following methods.

Figure 21:
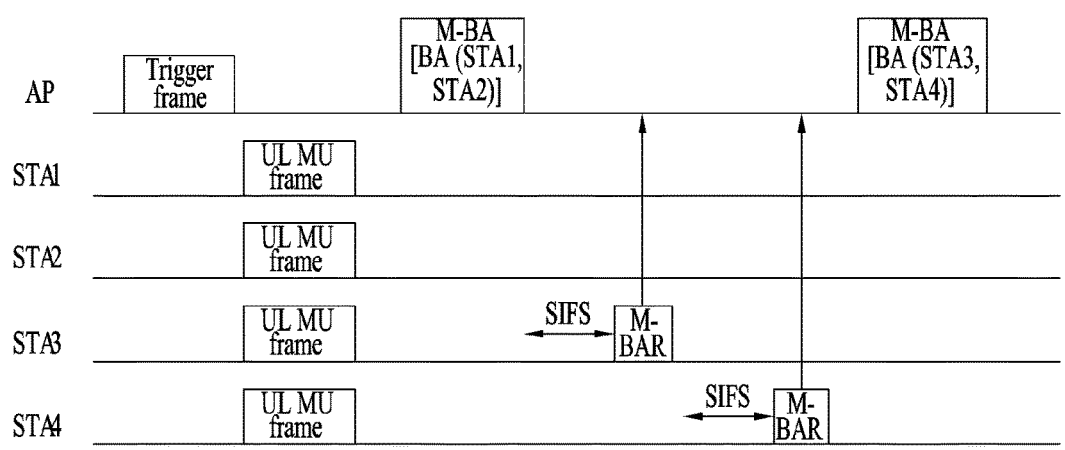
FIGS. 21 to 23 are diagrams for explaining a method of transmitting an M-BAR according to an embodiment of the present invention.
Figure 22:
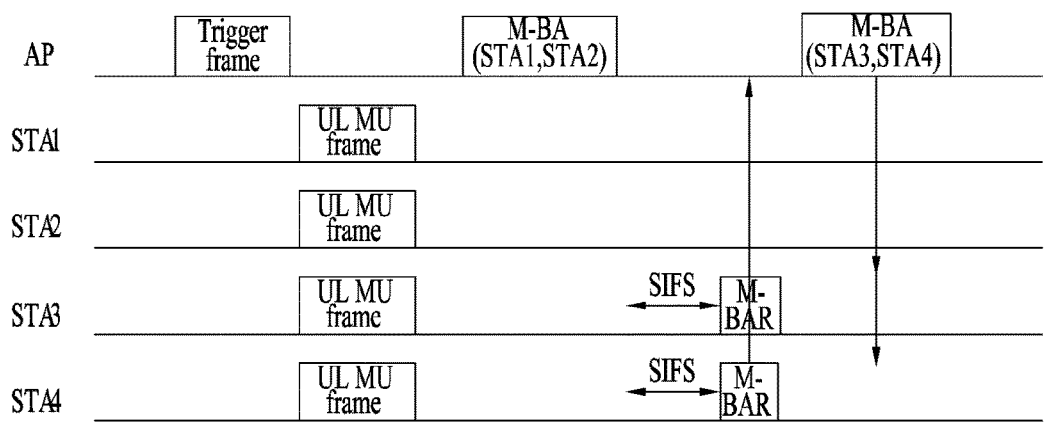
Figure 23:
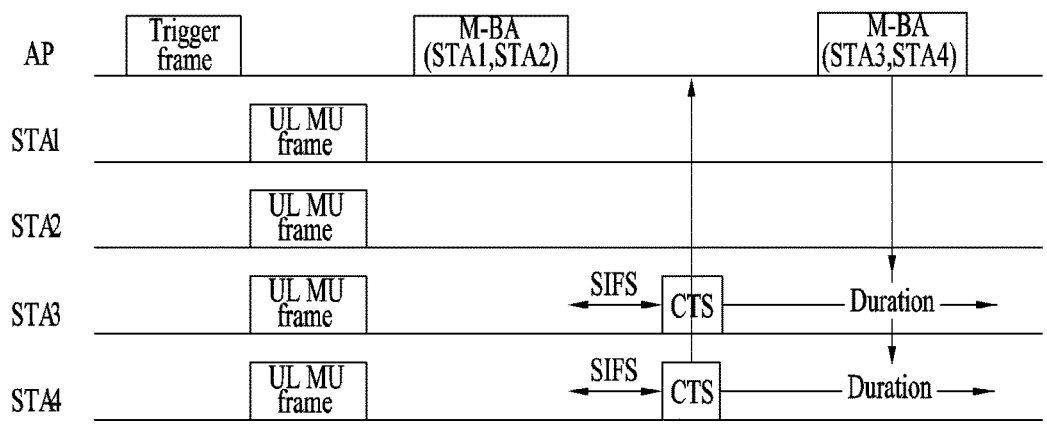

FIGS. 21 to 23 are diagrams for explaining a method of transmitting an M-BAR according to an embodiment of the present invention.

First, FIG. 21 illustrates a method of transmitting the M-BAR based on an SIFS. Specifically, STAs that do not include BA information in an M-BA may transmit M-BARs to the AP in order of STAs allocated in a Trigger frame and receive the M-BA.

Next, FIGS. 22 and 23 illustrate a method of transmitting the M-BAR based on an SFN. Specifically, STAs that do not include BA information in an M-BA may transmit M-BARs in the form of the SFN (at the same time and to the same position).

In the example of FIG. 22, upon receiving an M-BA, STA3 and STA4 may transmit M-BAR frames after an SIFS because BA information thereabout is not present in the first M-BA. Upon receiving the M-BAR frames, the AP may transmit an M-BA including BA information about the STAs.

Meanwhile, a CTS frame (or Ack) may be used instead of the M-BAR and FIG. 23 illustrates an example of using the CTS frame.

Herein, a duration included in the M-BAR/CTS/Ack frame is desirably configured as the next M-BA frame transmission end time.

Figure 24:
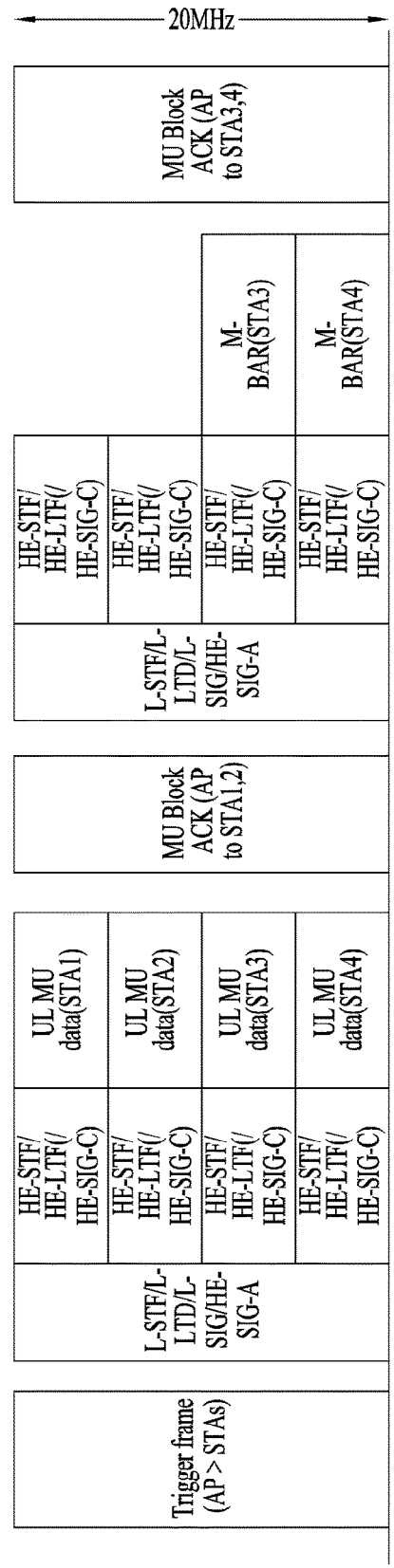
FIGS. 24 to 26 are diagrams illustrating the case in which STAs transmit M-BARs through a predetermined resource region according to an embodiment of the present invention.
Figure 25:
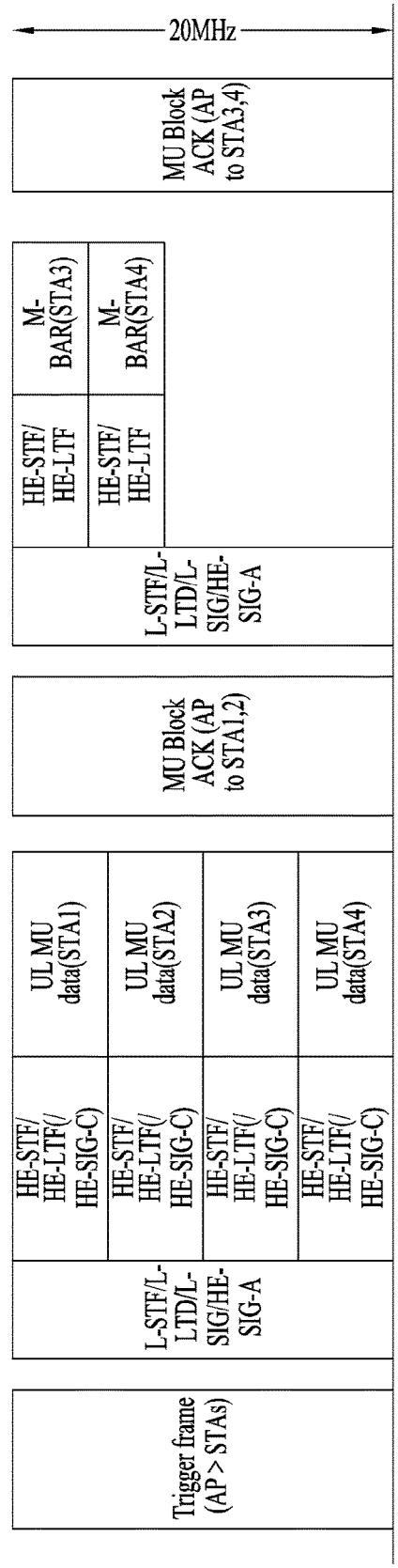
Figure 26:
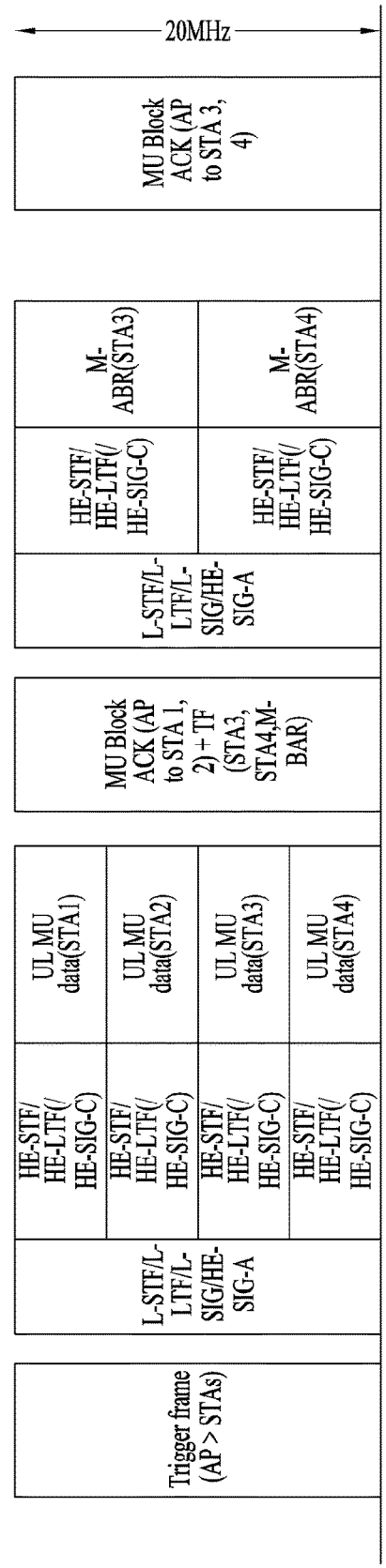

FIGS. 24 to 26 are diagrams illustrating the case in which STAs transmit M-BARs through a predetermined resource region according to an embodiment of the present invention.

Specifically, FIG. 24 is a diagram illustrating the case in which STAs transmit M-BARs to positions to which UL MU frames are transmitted. In the example of FIG. 24, upon receiving an M-BA, STA3 and STA4 may transmit M-BARs to the same positions as UL MU data transmission regions after an SIFS because BA information is not included in the M-BA. STA3 and STA4 may receive the M-BA from the AP through the transmitted M-BARs.

Meanwhile, the M-BARs may be transmitted to fixed positions in the form of UL MU OFDMA, which is illustrated in FIG. 25.

In the example of FIG. 25, the M-BARs may be transmitted with a fixed resource region size (e.g., 26 tones) and transmission positions of STAs may be sequentially determined in an order of STAs allocated in a Trigger frame.

As described above, upon transmitting the M-BA, the AP may also transmit the information (e.g., M-BAR Request Bitmap) indicating which STA should transmit an M-BAR. In addition, when an M-BAR is transmitted to a UL MU transmission position, UL MU transmission region allocation information (e.g., resource allocation position and size, MCS information, PPDU duration information, etc.) may be transmitted together with the M-BA, which is illustrated in FIG. 26.

That is, Trigger Frame (TF) information, which may be included in the same MPDU or PPDU, may be transmitted while an M-BA is transmitted as illustrated in FIG. 26 so that STA3 and STA4 may transmit M-BARs on proper resources. STA3 and STA4 may transmit the M-BARs to allocated regions based on information included in a TF.

Meanwhile, another embodiment of the present invention proposes a method of transmitting information (Other M-BA Presence) indicating whether another M-BA (including BA information about other STAs) is transmitted when an AP transmits an M-BA, instead of the above-described information (e.g., BAR Request Bitmap/M-BAR Request Bitmap) indicating which STA should transmit a BAR/M-BAR.

Figure 27:
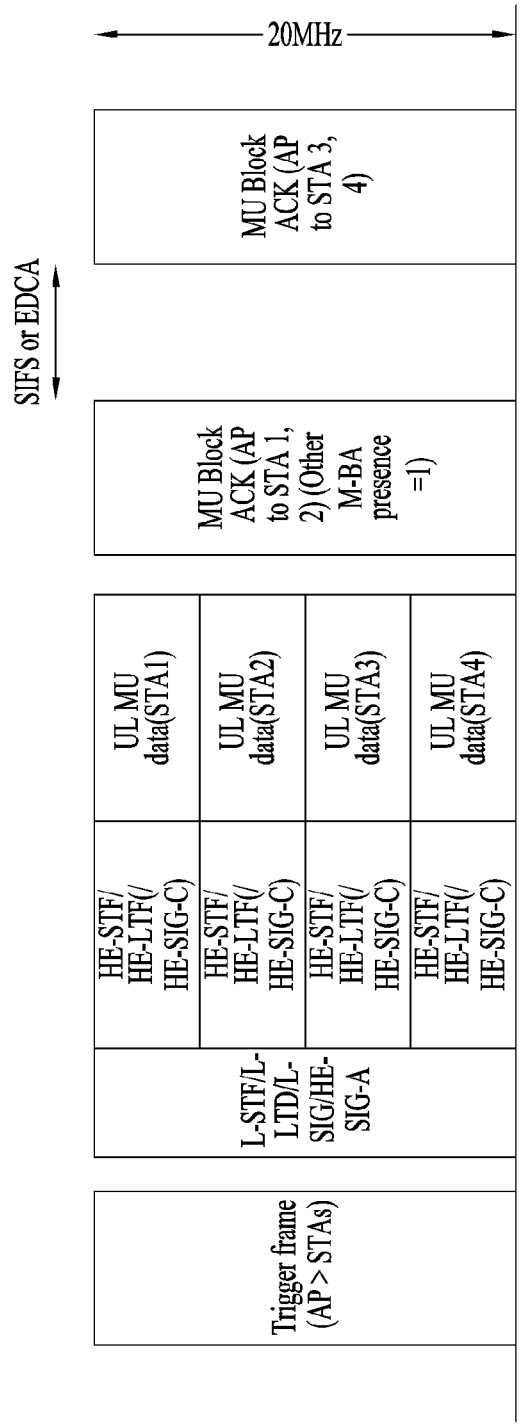
FIGS. 27 and 28 are diagrams for explaining a method of transmitting an additional Ack through a subsequent M-BA frame according to another embodiment of the present invention.
Figure 28:
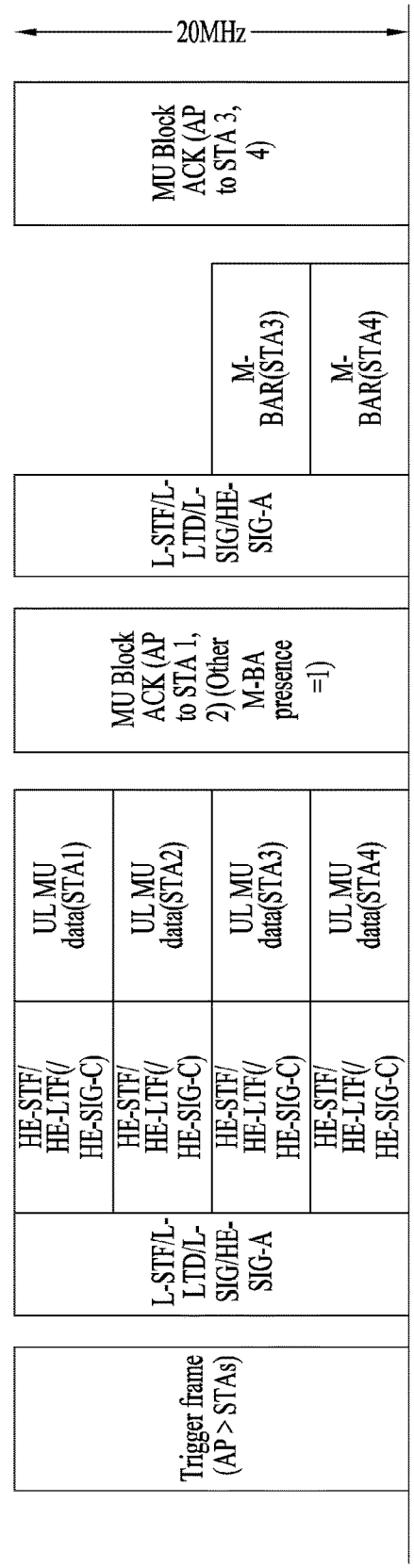

FIGS. 27 and 28 are diagrams for explaining a method of transmitting an additional Ack through a subsequent M-BA frame according to another embodiment of the present invention.

When STAs receive an M-BA, if BA information thereabout is not present in the M-BA and information indicating that an M-BA including a BA for other STAs is transmitted (Other M-BA Presence=1), the STAs may selectively perform one of the following operations.

First, as illustrated in FIG. 27, an STA may wait for another M-BA to be transmitted by the AP for a predetermined time (specific timer T1). Upon not receiving the M-BA before expiry of T1, the STA may transmit a BAR to the AP based on EDCA as illustrated in FIG. 27 and then receive a BA from the AP.

In this operation, the AP may transmit a subsequent M-BA after an SIFS or based on EDCA, after the first M-BA is transmitted.

As another method, the STA may transmit an M-BAR (or BAR) frame after an SIFS in the form of a UL MU frame (using a resource region in which the STA has transmitted the UL MU frame) or an SFN, as illustrated in FIG. 28. Then, after the SIFS, the STA may receive an M-BA transmitted by the AP.

Figure 29:
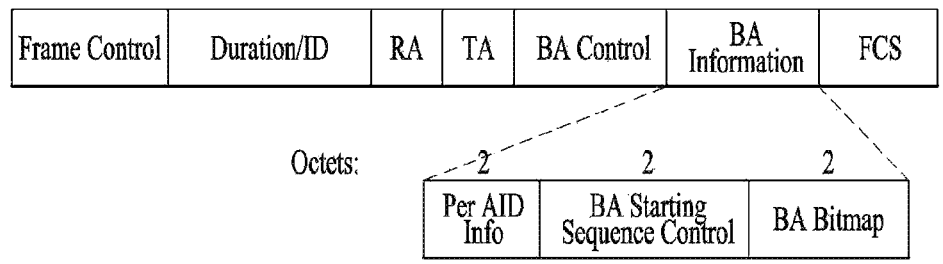
FIG. 29 is a diagram illustrating the type of an available M-BA frame according to another embodiment of the present invention.

FIG. 29 is a diagram illustrating the type of an available M-BA frame according to another embodiment of the present invention.

To include BAs of many STAs in one M-BA, a BA format as illustrated in FIG. 29 is proposed.

An embodiment of the present invention proposes configuring a BA Information field by reducing the size of a Block Ack Bitmap to 2 or 4 bytes from 8 bytes. In the M-BA frame of FIG. 29, the Block Ack Bitmap is 2 bytes by way of example. Information about whether the size of the BA Bitmap is reduced (e.g., Short BA Bitmap Indication (e.g., 1 or 2 bits)) may be transmitted in a BA Control field or a Per AID Info field. For example, when this field is 1 bit, 0 indicates an 8-byte bitmap and 1 indicates a 2-byte (or 4-byte) bitmap.

If the Short BA Bitmap Indication is 2 bits, 00, 01, and 10 may indicate an 8-byte bitmap, a 4-byte bitmap, and a 2-byte bitmap, respectively.

Figure 30:
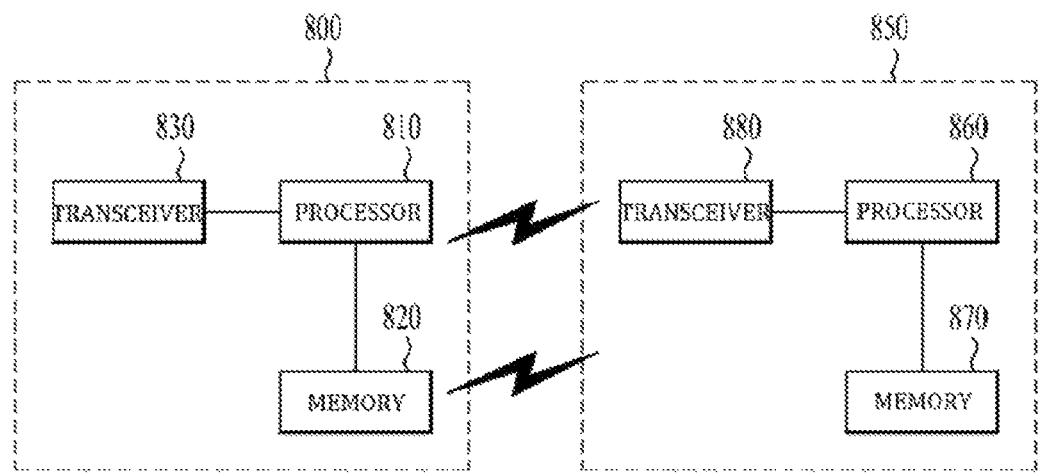
FIG. 30 is a diagram for explaining an apparatus for implementing the above-described method.

FIG. 30 is a diagram for explaining an apparatus for implementing the above-described method.

A wireless apparatus 800 of FIG. 30 may correspond to the above-described specific STA and a wireless apparatus 850 of FIG. 30 may correspond to the above-described AP.

The STA 800 may include a processor 810, a memory 820, and a transceiver 830 and the AP 850 may include a processor 860, a memory 870, and a transceiver 860. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880. The processors 810 and 860 may perform the above-mentioned UL MU scheduling procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the exemplary embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While Various embodiments of the present invention have been described in the context of an IEEE 802.11 based WLAN system, the present invention is not limited thereto. The present invention is identically applicable to various WLAN systems in which an AP can perform a block Ack mechanism for a plurality of STAs.

The invention claimed is:

1. A method of transmitting Acknowledgement/Negative Acknowledgement (Ack/Nack) signals for transmission data from a plurality of stations (STAs) by an Access Point (AP) in a Wireless Local Area Network (WLAN) system, the method comprising:
    transmitting a trigger frame to the plurality of STAs;
    receiving the transmission data from the plurality of STAs in response to the trigger frame; and
    transmitting Ack/Nack signals for the transmission data through a Multi-STA Block Ack (M-BA) frame,
    wherein the M-BA frame includes Ack/Nack signals for 'N' STAs among the Ack/Nack signals for the plurality of STAs,
    wherein 'N' is determined based on the transmission of the M-BA frame not exceeding a specific transmission unit time, and
    wherein the AP additionally transmits Ack/Nack signals, to one or more STAs among the plurality of STAs, not through the M-BA frame.

2. The method according to claim 1, wherein 'N' is determined based on the transmission of the M-BA frame not exceeding an Extended InterFrame Space (EIFS) time.

3. The method according to claim 1, wherein 'N' is determined differently according to an M-BA frame transmission scheme of the AP.

4. The method according to claim 1, wherein the AP transmits information for requesting transmission of a Block Ack Request (BAR) or a Multi-STA BAR (M-BAR) together with the M-BA frame to the one or more STAs.

5. The method according to claim 4, wherein, upon receiving the BAR or the M-BAR from the one or more STAs, the AP transmits the Ack/Nack signals for the one or more STAs through one or more Block Ack (BA) frames or another M-BA frame to the one or more STAs.

6. The method according to claim 1, wherein the M-BA frame includes information about transmission of another M-BA frame through which the Ack/Nack signals for the one or more STAs are transmitted.

7. The method according to claim 6, further comprising:
    receiving a Block Ack Request (BAR) transmitted based on Extended Distributed Channel Access (EDCA) from a first STA that has failed to receive the other M-BA frame until a specific timer T1 expires among the one or more STAs; and
    transmitting an Ack/Nack signal for the first STA in response to reception of the BAR.

8. The method according to claim 6, further comprising receiving a Block Ack Request (BAR) or a Multi-STA BAR (M-BAR) through a resource region used by the one or more STAs for data transmission from the one or more STAs.

9. A method of receiving an Acknowledgement/Negative Acknowledgement (Ack/Nack) signal for transmission data from an Access Point (AP) by a Station (STA) in a wireless local area network (WLAN) system, the method comprising:
receiving a trigger frame from the AP;
transmitting data through a multi-STA frame to the AP in response to the trigger frame; and
receiving a Multi-STA Block Ack (M-BA) frame from the AP,
wherein, when the M-BA frame does not include the Ack/Nack signal for the STA, the STA receives the Ack/Nack signal with reference to information about an additional Ack/Nack signal transmission scheme of the M-BA frame.

10. The method according to claim 9, wherein the information about the additional Ack/Nack signal transmission scheme is information for requesting transmission of a Block Ack Request (BAR) or a Multi-STA BAR (M-BAR) to the STA and the STA transmits the BAR or the M-BAR to the AP according to the information for requesting transmission of the BAR or the M-BAR.

11. The method according to claim 9, wherein the information about the additional Ack/Nack signal transmission scheme is information about another M-BA frame through which the Ack/Nack signal for the STA is transmitted and the STA monitors the other M-BA frame unit until a specific timer T1 expires.

12. An Access Point (AP) for transmitting Acknowledgement/Negative Acknowledgement (Ack/Nack) signals for transmission data from a plurality of stations (STAs) in a Wireless Local Area Network (WLAN) system, the AP comprising:
a transceiver configured to transmit a trigger frame to the plurality of STAs, receive the transmission data from the plurality of STAs in response to the trigger frame, and transmit Ack/Nack signals for the transmission data through a Multi-STA Block Ack (M-BA) frame; and
a processor connected to the transceiver and configured to process the trigger frame, the transmission data, and the M-BA frame,
wherein the processor causes the M-BA frame to include Ack/Nack signals for 'N' STAs among the Ack/Nack signals for the plurality of STAs,
wherein 'N' is determined based on the transmission of the M-BA frame not exceeding a specific transmission unit time, and
wherein the processor additionally transmits Ack/Nack signals, to one or more STAs among the plurality of STAs, not through the M-BA frame.

13. The AP according to claim 12, wherein 'NI' is determined based on the transmission of the M-BA frame not exceeding an Extended InterFrame Space (EIFS) time.

14. A Station (STA) for receiving an Acknowledgement/Negative Acknowledgement (Ack/Nack) signal for transmission data from an Access Point (AP) in a wireless local area network (WLAN) system, the STA comprising:
a transceiver configured to receive a trigger frame transmitted to a plurality of STAs including the STA, transmit the transmission data to the AP in response to the trigger frame, and receive a Multi-STA Block Ack (M-BA) frame from the AP; and
a processor connected to the transceiver and configured to process the trigger frame, the transmission data, and the M-BA frame,
wherein, when the M-BA frame does not include the Ack/Nack signal for the STA, the processor receives the Ack/Nack signal with reference to information about an additional Ack/Nack signal transmission scheme of the M-BA frame.

* * * * *